DATA EDITING SYSTEM
Filed Aug. 22, 1966
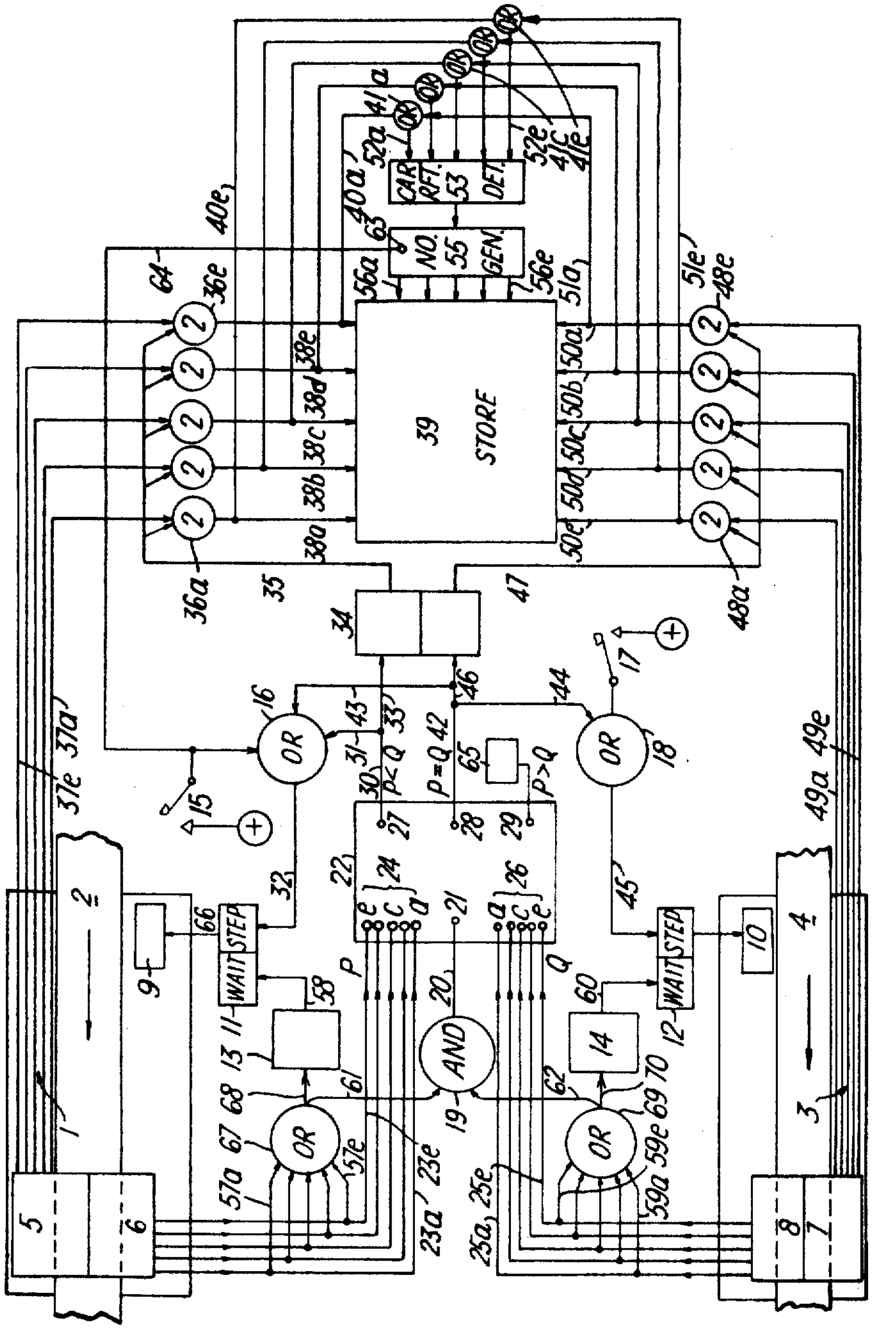
Inventor
FREDERICK P. MASON
By Percy P. Lantzy
Attorney United States Patent Office 3,474,416

Patented Oct. 21, 1969

3,474,416

DATA EDITING SYSTEM

Frederick Percival Mason, Brighton, England, assignor to Creed & Company Limited, Brighton, England, a British company Filed Aug. 22, 1966, Ser. No. 573,954
Claims priority, application Great Britain, Oct. 1, 1965, 41,733/65
Int. Cl. G11b *15/00, 31/00;* G06f *9/20*
U.S. Cl. 340—172.5 1 Claim

ABSTRACT OF THE DISCLOSURE

The disclosure concerns the typing of a fresh draft letter or the document from an amended original draft. When the original draft is typed an addressed tape record is also made. An "amendment" record is prepared containing the addresses of the passages of the original record which are to be amended and the substitution passages. The original and amendment records are fed into an apparatus according to the disclosure which compares the addresses on the two records, passes unamended passages of the original record to an output store and feeds to the output store the fresh passages from the amendment record in their correct places. From the output store a fresh draft incorporating all the amendments can then be obtained.

The invention relates to apparatus for automatically producing a machine-language output which corresponds to extracts from information carried on a first tape record alternating with extracts from information carried on an "amendment" tape record.

The preparation of most documents entails the typing of a draft copy, amendment of the draft in manuscript, typing of a second draft, followed possibly by further manuscript amendments and typing of further drafts. Nowadays the labour of typing the second and subsequent drafts may be minimised, especially when extensive passages remain unamended, by utilising for preparing a draft an apparatus which not only types the draft copy but which also, by the same keyboard operation, produces a record of the draft in machine language. When a new draft is required, the unamended passages are automatically retyped from the machine-language record, and only the fresh passages are inserted by keyboard operation.

If amendments are such that a fresh passage is no longer than the passage it replaces, and if the machine-language record is erasible, as in the case of a magnetic record, then a machine copy of an amended draft may be produced by erasing the unwanted part of the record and writing the new passage in its place.

If, however, the amended or fresh passage is longer than the original passage, or if the machine-language record is not erasible, then a complete new machine-language record is written on a fresh supply of recording medium.

In either of the foregoing cases the instructions to the apparatus are given piecemeal by the operator, who perforce waits while a passage is automatically retyped, then types manually a fresh passage, then waits again during automatic retyping of another passage, and so on. While this saves the operator's effort, it does not save much of the operator's time.

In accordance with the present invention there is provided apparatus for automatically producing a machine-language output which corresponds to extracts from information carried on a first tape record alternating with extracts from information carried on an "amendment" tape record, the first record having thereon means for the automatic identification of the location of consecutive passages of the information and the "amendment" record carrying instructions, in a form suitable for control of automatic equipment, as to the address on the first record of passages thereof to be amended together with fresh passages to replace those to be amended, the apparatus including: an output store; means for reading from the "amendment" record the address on the first record of the passage next to be amended and for passing to the output store the information content of the first record until the last mentioned passage is reached; means for advancing the first record to the end of the last mentioned passage and for inserting in the output store the content of the appropriate fresh passage (if any) read from the "amendment" record; and means for reverting to the feeding-in to the output store of the information carried on the first record until the next passage to be amended is reached.

In use of the invention for producing a fresh draft of a document to be amended, an "amendment" record in machine language is first produced, the operator inserts this record together with a machine-language record of the original draft into apparatus as specified above and connects the output store to an electric typewriter or other apparatus which produces printed copy from a machine-language input (and also, preferably, in view of possible further amendment, produces a machine-language record in concordance with the printed copy). A printed copy of the fresh draft is then automatically provided without further intervention by the operator.

Embodiments of the invention may include combined tape recording and printing equipment as part of, or which itself constitutes, the output store, or, as indicated above, such equipment may be separate from the apparatus of the invention. Again, the output store may include or be provided by equipment which produces a tape record in a form suitable for providing an input for printing apparatus such as an electric typewriter.

The invention will be further described with reference to the accompanying drawing which is a logic diagram illustrating the interaction of various units of apparatus incorporated in an embodiment of the invention.

A tape reader 1 deals with a tape 2 carrying the original text, and a tape reader 3 deals with a tape 4 carrying the amendments. The diagram has been drawn to pertain to a 5-element binary code, but adjustment to suit binary codes having other than 5 elements may be made in a manner obvious to those skilled in the art.

The tape 2 carries not only the original text but also the numbers of the lines into which that text is formed. One arrangement is that in which several tracks on the tape are assigned to the text while some other tracks are assigned to the line numbers. Reader 1 is then provided with two separate reading heads 5 and 6, of which head 5 reads the tracks assigned to the text while head 6 reads the tracks assigned to the line numbers.

The tracks carrying the text also carry the carriage return and line feed signals, and the mutual arrangement of the carriage return and line number signals in the tape and the mutual arrangement of heads 5 and 6 are such that head 6 reads the first digit of a number signal at the same instant that head 5 reads a carriage return signal. For the purpose of this description the carriage return signal and associated number precede the text of the relevant line.

Similarly, tape 4 carries not only the text for substitution but also the numbers of the lines in the original text which are to be replaced. Reading head 7 reads those tracks of tape 4 which are assigned to the substitute text while head 8 reads the tracks assigned to the line numbers. The phasing of the tape content and heads is such that head 8 will read a number completely, then head 7 will read the associated text.

Tape reader 1 includes a tape feeding device 9 while reader 2 includes a feeding device 10. Feeding device 9 is caused to feed or not to feed according to the condition of binary device 11. Feeding device 10 is caused to feed or not to feed according to the condition of binary device 12. Head 6 is connected to device 11 via conductors 57*a–e*, OR-gate 67, conductor 68, differentiator 13 and conductor 58 so that the advent of a number in head 6 will cause device 11 to be set to its WAIT condition and so cause feeder 9 to stop. Similarly, head 8 is connected via conductors 59*a–e*, OR-gate 69, conductor 70, differentiator 14 and conductor 60 to device 12 so that the advent of a number in head 8 will cause feeder 10 to stop.

The apparatus is used by first inserting tape 2 in reader 1 and pressing start button 15, which sends a signal via OR-gate 16 and conductor 32 to device 11, which is tripped to its STEP condition so as to cause feeder 9 to operate. Tape 2 is thus advanced through reader 1. When tape 2 has advanced so far that the first line number enters head 6 a signal appears on at least one of conductors 57*a–e* so that there will be an output signal from OR-gate 67. This signal passes via conductor 68 to differentiator 13, which emits a signal over conductors 58 to set bistable device 11 to its WAIT condition so that feeder 9 stops.

Next tape 4 is inserted in reader 3 and start button 17 is depressed, sending a signal via OR-gate 18 and conductor 45 to device 12, which is tripped to its STEP condition, so as to cause feeder 10 to operate. Tape 4 is thus advanced through reader 3. When tape 4 has advanced so far that the first line number it bears enters head 8, a signal appears on at least one of conductors 59*a–e* so that there will be an output signal from OR-gate 69. This signal passes via conductor 70 to differentiator 14, which emits a signal over conductor 60 to set bistable device 12 to its WAIT condition so that feeder 10 stops.

By a modification (not shown) it would be possible, if desired, to arrange that first both tapes are loaded, then the apparatus is started by depressing a single button. The situation is now that a number is present both in head 6 and in head 8. This results in both inputs of 2-way AND-gate 19 being present, so that AND-gate 19 emits a pulse which is delivered over conductor 20 to terminal 21 of comparator 22.

The purpose of comparator 22 is to discover whether the number being read by head 6 is greater than, equal to or less than the number being read by head 8. For this purpose the number in head 6 is communicated over conductors 23*a–e* to terminals 24*a–e* of comparator 22, and the number in head 8 is communicated over conductors 25*a–e* to terminals 26*a–e*. Comparator 22 is arranged in well-known manner so as to emit a pulse from its terminal 27 when and only when the number being read by head 6 is less than that being read by head 8. A pulse is emitted by terminal 28 when and only when the numbers are equal. A pulse is emitted by terminal 29 when and only when the number in head 6 is greater than that in head 8. The duration of the pulses emitted by terminals 27, 28 and 29 is limited to the duration of the pulse delivered over conductor 20 to terminal 21.

As a consequence of a pulse emitted from terminal 27, by conductors 30 and 31, OR-gate 16 and conductor 32, device 11 is tripped to its STEP condition so that feeder 9 operates, and by conductors 30 and 33 binary device 34 is tripped so as to deliver a signal over path 35 to one input terminal of each of 2-way AND-gates 36*a–e*. The other input of each of AND-gates 36*a–e* is contributed by reading head 5 over conductors 37*a–e*, and consequently the signals from head 5 are delivered over conductors 38*a–e* to storing apparatus 39, and over conductors 40*a–e* to OR-gates 41*a–e*.

If a pulse is emitted by terminal 28 it passes via conductors 42 and 43, OR-gate 16 and conductor 32 to trip device 11 to its STEP condition so that feeder 9 operates. The pulse from terminal 28 also passes via conductors 42 and 44, OR-gate 18 and conductor 45 to trip device 12 to its STEP condition so that feeder 10 operates. The pulse from terminal 28 also passes via conductors 42 and 46 to trip device 34 so that it emits a signal over conductor 47 but does not emit a signal over conductor 35. The signal over conductor 47 contributes one input to each of 2-way AND-gates 48*a–e*. The other input to each of AND-gates 48*a–e* arrives over conductors 49*a–e* from reading head 7. Therefore the signals from head 7 are emitted by AND-gates 48*a–e* and pass over conductors 50*a–e* to store 39 and over conductors 51*a–e* to OR-gates 41*a–e*.

The succession of information signals from head 5 will normally pass over conductors 37*a–e*, through gates 36*a–e*, over conductors 40*a–e* to gates 41*a–e* and thence over conductors 52*a–e* to device 53, which is able to distinguish a carriage return signal combination from all of the other information signal combinations. For this reason device 53 is called a "carriage return detector." When detector 53 detects the arrival of a carriage return signal, it emits a pulse over conductor 54 to stimulate number generator 55. The generator 55 consequently delivers a number signal over conductors 56*a–e* to store 39.

The succession of information signals from head 7 will pass over conductors 49*a–e*, through gates 48*a–e* and over conductors 50*a–e* to store 39 and over conductors 51*a–e* to OR-gates 41*a–e* whenever a signal prevails on conductor 47 as a result of comparator 22 having emitted a pulse from its terminal 28.

The number generator 55 is so devised that successive stimulations by pulses over conductor 54 will result in the generation of successive number signals in serially ascending order.

Number generator 55 is reset to zero when a pulse is delivered to its terminal 63 over conductor 64 by reason of the depression of button 15.

Store 39 can be of any form convenient for a particular application which permits the stored information entering by way of conductors 38*a–e* and 50*a–e* to be retrieved, for example by playing back into a local printer and/or over a transmission path to a remote recorder. If required, by the use of a suitable local or perforator printer, the numbers entering the store by path 56 could also be played back if further amendment is contemplated. It is also to be considered that store 39 may be a printer producing a readable record of the store input.

The sequential operation of the apparatus will be clear from the following description of the progressive processing of an original text of 25 lines recorded on tape 2 in accordance with amendment instructions for the substitution of new lines for lines 3, 7, 13 and 22 of the original. The substitute lines are recorded on tape 4.

The operator loads tape 2 into reader 1 and presses button 15. Device 11 changes to its STEP condition in response to button 15 and sets feeder 9 operating. Tape 2 advances in reader 1. When the code for line number 1 enters head 6 a signal passes over one or more of conductors 57*a–e* to differentiator 13, which sends a pulse over conductor 58 to set device 11 to WAIT and so stops feeder 9. Thus tape 2 is temporarily held with its code for line number 1 in head 6 and its first carriage return signal in head 5. A carriage return signal is thus presented to gates 36*a–e*.

The operator next loads tape 4 into reader 3 and presses button 17. Device 12 changes to its STEP condition and sets feeder 10 operating. Tape 4 advances in reader 3. When the code for line number 3 enters head 8 a signal passes over one or more of conductors 59*a–e* to gate 69 and thence via conductor 70 to differentiator 14 which sends a pulse over conductor 60 to device 12, which changes to its WAIT condition and stops feeder 10. Head 6 is now sending the code for number 1 over conductors 23*a–e* to comparator 22, and head 8 is sending the code for number 3 over conductors 25*a–e*.

Gate 19 is now receiving a first input over conductor 61 from gate 67 and a second input over conductor 62 from gate 69, and it therefore sends a signal over conductor 20 to comparator 22, which consequently makes a comparison between the number received from head 6 and that received from head 8. Comparator 22 decides that the head 6 number is less than the head 8 number and emits a signal from terminal 27 to pass over conductors 30 and 31, via gate 16, over conductor 32 to trigger device 11 to its STEP condition to restart feeder 9. However, the signal from terminal 27 of comparator 22 also passes over conductors 30 and 33 to trigger device 34, which immediately emits a signal over conductor 35 to open gates 36*a–e*, so that, before feeder 9 has had time to respond and thus before the carriage return signal on conductor 37 has been disturbed, this carriage return signal is passed to store 39 and there recorded, and is also passed via gates 41*a–e* to detector 53, which emits a pulse and causes generator 55 to emit a code signal number 1 which is recorded by store 39.

Subsequently, as feeder 9 advances tape 2 through head 5, the character signals for line 1 of the text pass over route 37, 36, 38 and are recorded successively by store 39. Eventually, the characters for line 1 will all have been dealt with and at the next step of feeder 9 a carriage return code enters head 5 and a code for line number 2 enters head 6.

The entry of a number code into head 6 causes differentiator 13 to respond and trip device 11 to its WAIT condition to stop feeder 9. Meanwhile, the code for line number 3 has remained in head 8. Gate 19 therefore now receives two inputs, one from gate 67 over path 61 and the other from gate 69 over path 62. The code for number 2 is present at comparator terminals 24*a–e* and the code for number 3 is present at terminals 26*a–e*. Gate 19 stimulates comparator 22 over path 20 and the resulting comparison causes a second pulse to be emitted from terminal 27, since the code at terminals 24*a–e* is for a lower number than the code at terminals 26*a–e*. Hence, by a process identical to that which was consequent upon the first pulse emitted by terminal 27, store 39 received a code for number 2 over paths 56*a–e* and then receives the information for the successive characters in line number 2 over path 37, 36, 38.

When all of the characters in line number 2 have been thus dealt with, the next step of feeder 9 brings carriage return No. 3 into head 5 and line code No. 3 into head 6. Gate 19 again has two inputs and stimulates comparator 22 over path 20. The codes presented to terminals 24*a–e* and 26*a–e* are now identical, whereupon terminal 28 emits a pulse which has three effects. Over route 42, 43, 16, 32 device 11 is tripped to its STEP condition to cause feeder 9 to resume operation. Over route 42, 46 device 34 is tripped to de-energise path 35 and energise path 47, thus closing gates 36*a–e* and providing one input to each of gates 48*a–e*. Over route 42, 44, 18, 45 device 12 is tripped to its STEP condition to cause feeder 10 to start operating. However, before feeder 10 can respond, and thus while the carriage return signal for line number 3 is still present in head 7, the carriage return code is passed over route 49, 48, 50 to store 39, and over route 49, 48, 51, 41, 52 to detector 53, which responds, stimulates generator 55, which injects the code for number 3 into store 39 over path 56.

Subsequently, readers 1 and 3 step in unison, reader 1 merely advancing tape 2 to by-pass the unwanted line No. 3 information recorded therein, while reader 3 is generating the information signals for the substitute line No. 3, these signals passing over route 49, 48, 50 to store 39. When readers 1 and 3 have dealth with the content of line No. 3, the next step of reader 1 will bring a carriage return code (the fourth) into head 5 and the code for line No. 4 into head 6; at the same time the next step of reader 3 will bring a carriage return code (the second) (to occur on tape 2) into head 7 and the code for line No. 7 into head 8.

This situation results in devices 11 and 12 stopping feeders 9 and 10, in gate 19 stimulating comparator 22 over path 20, in comparator 22 comparing the code number 4 at terminals 24 with code number 7 at terminals 26, and consequently emitting a pulse from terminal 27, so that feeder 9 is started and feeder 12 remains stopped, gates 36 open and gate 48 close, so that the content of tape 2 for line No. 4 is passed to store 39 preceded by storage of the code line number 4 generated by generator 55.

This routine continues until tape 2 is advanced to the point at which the code for line No. 7 enters head 6. The consequence of this is similar to that described above for the entry of code No. 3 into head 6.

The process continues, changing from one sub-process to another each time the comparator 22 discovers a state of the code at 24 being less than the code at 26 subsequent to its having discovered equality at the preceding comparison, and each time the comparator 22 discovers a state of equality at 24 and 26 subsequent to its having discovered the code at 24 to be less than that at 26 at the preceding comparison. The end of the process occurs when both tape 2 and tape 4 have completely traversed their readers.

It should be noted that during correct operation the code read by head 6 and presented to terminal 24 can never exceed the code read by head 8 and presented to terminal 26. If at any time the code at 24 exceeds that at 26 the comparator emits a signal from terminal 29 and gives an alarm by device 65.

If two or more lines are to be substituted for a single original line, the tape 4 will bear the line number of the line to be replaced. This number will be associated with the carriage return signal preceding the first substitute line only. The carriage return signals for the following substitute lines will not have associated numbers in tape 4, the spaces where such numbers would normally be recorded in this case remaining blank.

If a line of the original is merely to be deleted, tape 4 will bear nothing but that line number.

Various modifications to the arrangement described above may be made in a manner which will be apparent to this skilled in the art. For example, instead of it being necessary, on the tape carrying the amendments, to record the whole of a line rather than, perhaps, a single word in that line which is to be altered, the address given on the second tape could be of the form "line *m* word *n*" followed by a coded instruction for deletion or substitution of the next following word or passage, or the insertion before the next word of a further word or passage. To enable the tape to be stopped at the correct word address, the comparator 22 may include a device recognizing a space code read by the head 5 and coupled to a counter which counts the number of spaces subsequent to arrival of tape 2 at the correct line and then, and only then, feed an output signal from terminal 28 to insert in store 29 the additional or amended matter from tape 4. An additional device such as a count-down pulse generator set by appropriate code-activated triggers is then needed to interpret from tape 4 at instruction as to the length, if any, of the passage from tape 2 to be deleted and arrangements made to modify the connections to the stepping device 11 via the count-down generator so as to step the tape 2 in accordance with the deletion instructions from tape 4.

If desired the store 39 or the recording apparatus which it feeds may include arrangements, along the lines commonly adopted on electric typewriters, for example, to adjust the length of lines in accordance with predetermined margin settings for the typed page. In such case the original carriage return signals fed into the store would be ignored and new ones substituted as in known arrangements. The tapes 2 and 4 would then have to include additional code signals to indicate the ends of paragraphs.

It is to be understood that the foregoing description of specific examples of this invention is made by way of example only and is not to be considered as a limitation on its scope.

What we claim is:

1. Apparatus for automatically producing a machine-language output which corresponds to extracts from information carried on a first tape record alternating with extracts from information carried on an amendment tape record, the first record having thereon means for automatic identification of the location of consecutive passages of the information wherein the information is divided up into lines with a carriage return signal at the end of each line with the said consecutive passages being consecutive lines, and the amendment record carrying instructions as to the address on the first record of passages thereof to be amended together with fresh passages to replace those to be amended, the information and message content of the first and amendment records is in the form of parallel mode code signals and the tape records carrying separate channels for address purposes, the apparatus including:

an output store;

two pairs of reading heads, one pair for reading each tape, one head of which is arranged for reading the information to be fed to the output store and the other head for reading the address channel;

gating and tape advancing means coupled to each address reading head and arranged for stopping or advancing the respective tape record;

a comparator coupled to each of the address reading heads and to the gating means for comparing the addresses from each of the tape records, and the comparator output coupled to control through following OR-gates the advance of either the information tape or the amendment tape depending on the output condition;

a plurality of input AND-gates coupled to the output store from each of the reading heads;

a device under control of the comparator output which enables one or the other of the input AND gates according to the output condition to permit feeding into the store the information from the respective tapes which is to be collated by the apparatus;

a plurality of input OR-gates individually coupled to the outputs of the input AND-gates;

a carriage return detector coupled to the output of the input OR-gates to control, in response to a carriage return signal detection, a number of generators which emit a number signal to the store in serially ascending order, whereby the output condition of the comparator controls the feeding into the store the information from the respective tapes which is to be delivered by the apparatus and controls the time for selective advancing of the tape records.

References Cited

UNITED STATES PATENTS

| | | | |
|---|---|---|---|
| 3,372,378 | 5/1968 | Devore et al. | 340—172.5 |
| 3,248,705 | 4/1966 | Dammann et al. | 340—172.5 |
| 3,233,224 | 2/1966 | Foster et al. | 340—172.5 |
| 3,107,342 | 10/1963 | Estrems et al. | 340—172.5 |
| 3,007,137 | 10/1961 | Page et al. | 340—172.5 |

GARETH D. SHAW, Primary Examiner